(12) United States Patent
Carlsson et al.

(10) Patent No.: US 10,866,571 B2
(45) Date of Patent: Dec. 15, 2020

(54) AUTOMATION FRAMEWORK AND CONTROLLING METHOD

(71) Applicant: Tetra Laval Holdings & Finance S.A., Pully (CH)

(72) Inventors: Magnus Carlsson, Kristianstad (SE); Davide Clo', Bologna (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/612,551

(22) PCT Filed: May 4, 2018

(86) PCT No.: PCT/EP2018/061506
§ 371 (c)(1),
(2) Date: Nov. 11, 2019

(87) PCT Pub. No.: WO2018/206428
PCT Pub. Date: Nov. 15, 2018

(65) Prior Publication Data
US 2020/0201278 A1    Jun. 25, 2020

(30) Foreign Application Priority Data
May 12, 2017 (EP) .................... 17170827

(51) Int. Cl.
*G05B 19/042* (2006.01)
*G05B 19/05* (2006.01)

(52) U.S. Cl.
CPC ....... *G05B 19/0426* (2013.01); *G05B 19/056* (2013.01)

(58) Field of Classification Search
CPC .............. G05B 19/0426; G05B 19/056; G05B 2219/23255; G05B 2219/13148
See application file for complete search history.

(56) References Cited

U.S. PATENT DOCUMENTS 6,032,574 A    3/2000 Brayton et al.
2008/0082186 A1*  4/2008 Hood .................. G05B 19/042
                                                                          700/83
(Continued)

OTHER PUBLICATIONS

Bonfe M et al.; Object-oriented approach to PLC software design for a manufacture machine using IED 61131-3-norm languages. Advanced Intelligent Mechatronics, 2001. vol. 2, Jul. 8, 2001, pp. 787-792.
(Continued)

*Primary Examiner* — Mohammad Ali
*Assistant Examiner* — Vincent W Chang
(74) *Attorney, Agent, or Firm* — Knobbe Martens Olson & Bear LLP (57) ABSTRACT

A method for controlling an automation framework in a manufacturing system for containers with food content is disclosed comprising isolating at least first and second control functionalities of a plurality of devices from each other so that the first and second control functionalities are independently accessible to a control unit as respective first and second isolated control functionalities, generating a set of combined control functionalities for the first and/or the second device based on the first and second sets of isolated control functionalities, wherein the set of combined control functionalities are individually accessible to a control unit, and controlling at least the first and/or second device of the plurality of devices based on at least the set of combined control functionalities with an application manager configured to communicate with the control unit. An associated automation framework is also disclosed.

18 Claims, 7 Drawing Sheets

(56) References Cited

U.S. PATENT DOCUMENTS

| | | | |
|---|---|---|---|
| 2012/0022669 A1* | 1/2012 | Forster | G05B 19/0426 700/19 |
| 2012/0265324 A1* | 10/2012 | Colombo | G05B 19/4188 700/29 |
| 2017/0357253 A1* | 12/2017 | Kilpatrick | G05B 19/0428 |
| 2019/0041830 A1* | 2/2019 | Yarvis | G05B 19/042 |

OTHER PUBLICATIONS

Ulf Schünemann; Programming PLCs with an Object-Oriented Approach; Engineering Embedded Systems, Feb. 2007, pp. 59-63.

International Search Report and Written Opinion for International Application No. PCT/EP2018/061506; dated Jul. 23, 2018; in 9 pages.

Extended European Report issued in European Patent Application No. 17170827.4; dated Nov. 23, 2017; in 10 pages.

* cited by examiner

AUTOMATION FRAMEWORK AND CONTROLLING METHOD

TECHNICAL FIELD

The present invention generally relates to the field of automation. More particularly, the present invention relates to a method of controlling an automation framework for a plurality of devices and to an associated automation framework, in particular for filling machines and related systems for manufacturing containers provided with fillable food content such as processing apparatuses, cap- or straw applicators, or distribution equipment.

BACKGROUND

Serviceability is an important criterion in various automation environments, in particular in systems having a highly diverse range of functionalities such as in filling machines. In situations, it is desired to introduce new functionalities for controlling such machines or performing customized service functions. A problem with previous solutions is the time-consuming implementation of such new functionalities, due to the customization needed for each machine to integrate and validate these functionalities. This will accordingly impede the responsiveness to customer's needs, and increase the down-time of the machines and increase costs. A further issue with existing solutions is the limited abilities to target specific service needs, without invoking a disproportional part of the system resources, for example by needing to take the whole production off-line, and/or waste volumes of products. This will limit the throughput of the production line and generally make any troubleshooting or integration of new functionalities more difficult and less user-friendly.

Hence, an improved automation framework and associated method of controlling an automation framework would be advantageous, in particular for filling machines and related systems for manufacturing containers provided with fillable food content such as processing apparatuses, cap- or straw applicators, or distribution equipment. It would be in particular advantageous to allow for avoiding more of the above-mentioned problems and compromises, including providing for a facilitated and improved service and maintenance capabilities, facilitated integration of new hardware in the automation system, facilitated distribution and implementation of new software and/or hardware functionalities in the automation system, improved software re-usability, facilitated simulation capabilities, efficient use of machine resources, and facilitated integration of production lines to networks of intelligent interconnected and communicating machines.

SUMMARY

Accordingly, examples of the present invention preferably seek to mitigate, alleviate or eliminate one or more deficiencies, disadvantages or issues in the art, such as the above-identified, singly or in any combination by providing a device according to the appended patent claims.

According to a first aspect a method is provided of controlling an automation framework for a plurality of devices in a manufacturing system for containers with food content, each of the devices being connected to respective associated control modules having sets of control functionalities controlling the function of the plurality of devices in response to equipment functions $E_F$ communicating with the control modules to activate a series of said control functionalities, wherein, for a first device of the plurality of devices, in an associated first control module, a first control functionality is in dependence of a second control functionality in a first series of control functionalities, whereby a change of status of the first control functionality to control the first device is associated with a change of status of the second control functionality. The method comprises isolating the first and second control functionalities from each other so that the first and second control functionalities are independently accessible to a control unit as respective first and second isolated control functionalities, whereby the status of the first isolated control functionality is independent of the status of the second isolated control functionality, whereby the first device and a second device of the plurality of devices each has respective first and second sets of isolated control functionalities. The method comprising generating a set of combined control functionalities for the first and/or the second device based on the first and second sets of isolated control functionalities, wherein the set of combined control functionalities are individually accessible to the control unit, and controlling at least the first and/or second device of the plurality of devices based on at least the set of combined control functionalities with an application manager configured to communicate with the control unit.

According to a second aspect an automation framework is provided for a plurality of devices in a manufacturing system for containers with food content, each of the devices being connected to respective associated control modules having sets of control functionalities controlling the function of the plurality of devices in response to equipment functions communicating with the control modules to activate a series of said control functionalities, wherein, for a first device of the plurality of devices, in an associated first control module, a first control functionality is in dependence of a second control functionality in a first series of control functionalities, whereby a change of status of the first control functionality to control the first device is associated with a change of status of the second control functionality. The automation framework comprises a first processing module configured to isolate the first and second control functionalities from each other so that the first and second control functionalities are independently accessible to a control unit as respective first and second isolated control functionalities, whereby the status of the first isolated control functionality is independent of the status of the second isolated control functionality, whereby the first device and a second device of the plurality of devices each has respective first and second sets of isolated control functionalities. The automation framework comprises a second processing module configured to generate a set of combined control functionalities for the first and/or second device based on the first and second sets of isolated control functionalities, wherein the set of combined control functionalities are individually accessible to the control unit, and an application manager configured to communicate with the control unit to control at least the first and/or second device of the plurality of devices based on at least the set of combined control functionalities.

According to a third aspect a computer program product is provided comprising instructions which, when the program is executed by a computer, cause the computer to carry out the steps of the method according to the first aspect.

According to a fourth aspect a filling machine is provided comprising an automation framework according to the second aspect and/or controlled by the method according to the first aspect.

Further examples of the invention are defined in the dependent claims, wherein features for the second and third aspects of the disclosure are as for the first aspect mutatis mutandis.

Some examples of the disclosure provide for facilitated and improved service and maintenance capabilities.

Some examples of the disclosure provide for facilitated integration of new hardware in the automation system.

Some examples of the disclosure provide for facilitated distribution and implementation of new software and/or hardware functionalities in the automation system.

Some examples of the disclosure provide for improved software re-usability.

Some examples of the disclosure provide for facilitated simulation capabilities.

Some examples of the disclosure provide for efficient use of machine resources.

Some examples of the disclosure provide for facilitated integration to networks of intelligent interconnected and communicating machines.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Figure 1:
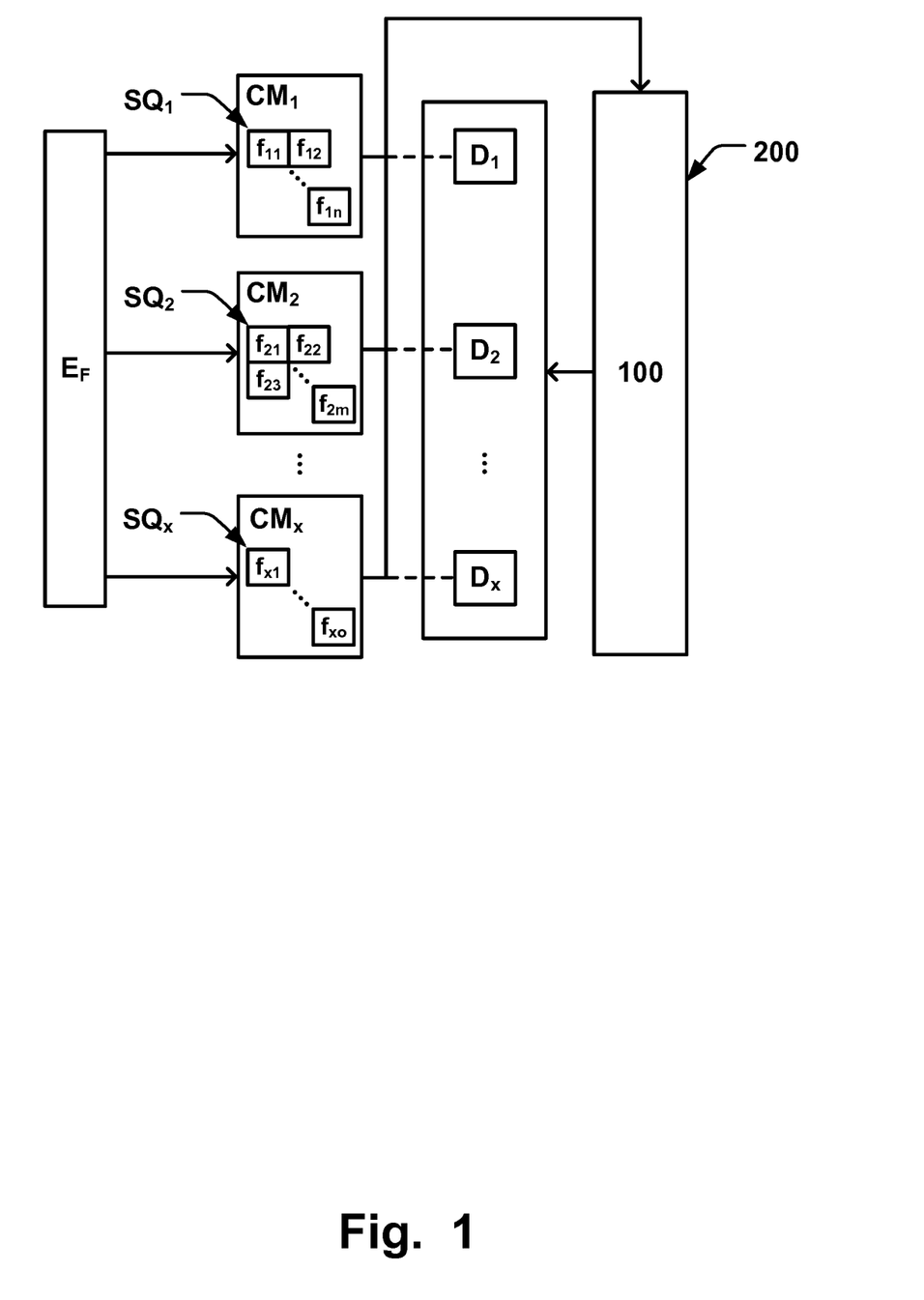
FIG. 1 is a schematic illustration of an automation network according to one example.

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements. Although the present disclosure refers to filling machines and related systems for manufacturing containers provided with fillable food content such as processing apparatuses, cap- or straw applicators, or distribution equipment, the disclosure is applicable to a wide range of automation environments in various industries where the same problems set out to solve by the present disclosure arise, such as in general processing and manufacturing industries. FIG. 1 is a schematic high-level illustration of an example of an automation system having an automation framework 100, such as a framework 100 in a manufacturing system for containers with food content, in which a method 200 is provided. FIGS. 2-5 are further schematic illustrations of an automation framework 100 for a plurality of devices $D_1, D_2, \ldots, D_x$, in more detail. Turning again to the example of FIG. 1, the plurality of devices $D_1$, $D_2$ are connected to associated control modules $CM_1$, $CM_2$, having sets of control functionalities $f_{1n}$, $f_{2m}$, controlling the function of the plurality of devices $D_1$, $D_2$, in response to equipment functions $E_F$ communicating with the control modules $CM_1$, $CM_2$, to activate a series $SQ_1$, $SQ_2$ of said control functionalities $f_{1n}$, $f_{2m}$. The equipment functions $E_F$ may thus be high level functions to be performed by the devices $D_x$. For example, an equipment function could be the function of sealing of a packaging container. A plurality of control functionalities $f_{1n}$, $f_{2m}$, may then need to be activated to control a plurality of devices $D_1$, $D_2$, involved in the sealing operation. For example, a first device $D_1$ may adjust the sealing element, such as an inductor in a jaw assembly, for welding the material of the packaging container, and a second device $D_2$ may be a cutting mechanism for cutting the packaging material after the welding operation. Each of the devices $D_1$, $D_2$, may have several control functionalities $f_{1n}$, $f_{2m}$, in respective control modules $CM_1$, $CM_2$. E.g. the current to the inductor is controlled, which may then be a first control functionality $f_{11}$, as well as the pressure by which the inductor is pressed against the packaging material, which may be a second control functionality $f_{12}$. A series of control functionalities $SQ_1$ may thus be construed as a combination of such first and second control functionalities $f_{11}$, $f_{12}$, that together operates the inductor. Although the following example discuss $D_1$, $D_2$, several more devices may be present, as illustrated by the denotation of device $D_x$, which may be in communication with respective control modules $CM_x$. Similarly, a plurality of different equipment functions $E_f$ may interact with any number of the plurality of devices $D_x$, via activation of different sets or series $SQ_x$ of control functionalities $f_{1n}, f_{2m}, \ldots, f_{xo}$ in control modules $CM_1, CM_2, \ldots, CM_x$. In one example, for a first device $D_1$ of the plurality of devices, in an associated first control module $CM_1$, a first control functionality $f_{11}$ is in dependence of a second control functionality $f_{12}$ in a first series $SQ_1$ of control functionalities. Thus, a change of status of the first control functionality $f_{11}$ to control the first device $D_1$ is associated with a change of status of the second control functionality $f_{12}$. I.e. the control functionalities $f_{11}$, $f_{12}$, are associated to one another via the equipment function $E_f$ that communicates a series $SQ_1$ of such interrelated control functionalities to the control module $CM_1$, for control of the first device $D_1$. Activation of the first control functionality $f_{11}$ (i.e. changing the status thereof) of the device $D_1$ will accordingly also invoke a status change of the second control functionality $f_{12}$ due to the interrelation therebetween.

Figure 2:
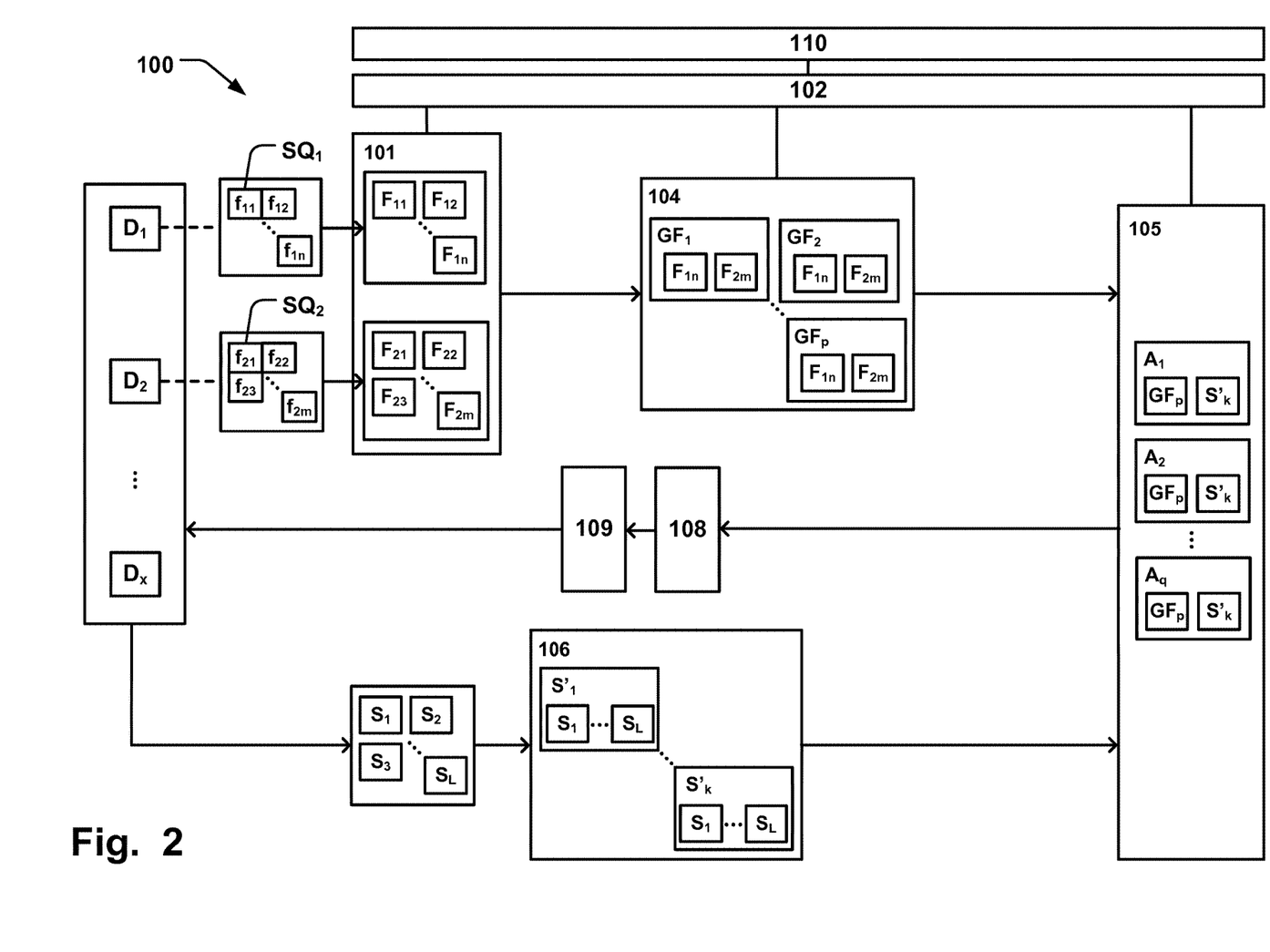
FIG. 2 is a schematic illustration of an automation network according to one example.

Turning to FIG. 2, schematically illustrating an example of a flow, which associated control functionalities of the plurality of devices $D_x$ are subjected to, in the automation framework 100 and in associated method 200, to provide for the advantageous effects elucidated in the present disclosure. The automation framework 100 comprises a first processing module 101 configured to isolate the first and second control functionalities $f_{11}$, $f_{12}$, from each other so that the first and second control functionalities $f_{11}$, $f_{12}$, are independently accessible to a control unit 102 as respective first $F_{11}$ and second $F_{12}$ isolated control functionalities. Thus, the status of the first isolated control functionality $F_{11}$ is independent of the status of the second isolated control functionality $F_{12}$. Interrelated control functionalities $f_{1n}$, $f_{2m}$, defined in fixed series $SQ_1$, $SQ_2$, by equipment functions $E_f$ for control of devices $D_1$, $D_2$, according to previously pre-determined patterns, can thus be individually accessible via access to the now isolated control functionalities $F_{1n}$, $F_{2m}$, as schematically illustrated in FIG. 2. The first device $D_1$ and the second device $D_2$ of the plurality of devices thus have respective first $F_{1n}$ and second $F_{2m}$ sets of isolated control functionalities. Since the number of control functionalities $f_{1n}$ and $f_{2m}$ may vary among the plurality of devices, there may also be a variation in the sets of first $F_{1n}$ and second $F_{2m}$ isolated control functionalities, as indicated in FIG. 2. As mentioned above, reference to devices D1 and D2 is merely for the purpose of clarity of the disclosure, and it is conceivable that a plurality of devices $D_x$ have a multitude of different control functionalities $f_{xo}$, in communication with various equipment functions $E_f$ for activation of various series $SQ_x$ of such functionalities. The first processing module 101 may thus be configured to isolate the respective pluralities of control functionalities $f_{xo}$ as isolated control functionalities $F_{xo}$, individually accessible to the control unit 102.

The automation framework 100 comprises a second processing module 104 configured to generate a set of combined control functionalities $GF_1$, $GF_2$, . . . , $GF_p$, for the first and/or second device $D_1$, $D_2$, based on the first and second sets of isolated control functionalities $F_{1n}$, $F_{2m}$, as schematically illustrated in FIG. 2. It is thus possible to combine the different isolated individually accessible device functions, i.e. the isolated control functionalities $F_{1n}$, $F_{2m}$, in different sets of combined control functionalities $GF_1$, $GF_2$, . . . , $GF_p$, which are also individually accessible to the control unit 102. The automation framework 100 comprises an application manager 105 being configured to communicate with the control unit 102 to control the function of at least the first and/or second device $D_1$, $D_2$, of the plurality of devices based on the set of combined control functionalities $GF_1$, $GF_2$, . . . , $GF_p$, as schematically illustrated in FIG. 2. The application manager 105 may be configured to combine any plurality of the combined control functionalities as individual sets of application modules $A_1$, $A_2$, . . . , $A_q$, for controlling any of the devices $D_x$. It is thus possible to break apart previously coupled functionalities (i.e. series $SQ_x$ of control functionalities $f_{xo}$) by establishing new communication paths between the control functionalities $f_{1n}$, $f_{2m}$, . . . , $f_{xo}$, as described above, and explained in more detail in relation for FIG. 5, to build targeted combined control functionalities $GF_1$, $GF_2$, . . . , $GF_p$, being specific to new implementations or tasks, such as various service functionalities, in an automation system having the automation framework 100. Such targeted functionality will moreover provide for more efficient use of machine resources, since only the specific control functionalities relevant for the task needs to be activated. In the example given above with respect the sealing operation of a packaging container, it thus possible for example to provide an application module for a calibration operation which targets only part of the control functionalities ($f_{1n}$, $f_{2m}$, . . . , $f_{xo}$) in a facilitated manner. For example, it may be desired to optimize the pressure by which the inductor press against the packaging material. Only control functionalities ($f_{1n}$, $f_{2m}$, . . . , $f_{xo}$) of the control modules $CM_1$, $CM_2$, . . . , $CM_x$, involved in the motion of the inductor and the pressure sensing operation may thus be invoked in a combined control functionality $GF_1$. This provides for facilitated optimization of the process as a whole. For example, the amount of packaging material wasted may be reduced, since functionalities requiring the presence of such packaging material may be excluded.

Different sets of combined control functionalities $GF_1$, $GF_2$, . . . , $GF_p$, may be pre-determined when off-line from an operational mode of a PLC controlling the manufacturing system for the containers. Further, pre-defined sequences of control functionalities $f_{1n}$, $f_{2m}$, . . . , $f_{xo}$ executed by such PLC may be interrupted by activating a service mode thereof. While in the service mode, the automation framework 100 overrides the pre-set sequences of control functionalities $f_{1n}$, $f_{2m}$, . . . , $f_{xo}$ programmed in the PLC, and communication with the devices $D_x$ is instead established via the combined control functionalities $GF_1$, $GF_2$, . . . , $GF_p$, and the application manager 105. The pre-defined sequences of control functionalities $f_{1n}$, $f_{2m}$, . . . , $f_{xo}$, may then be resumed, when terminating the service mode and switching control back to the PLC. The automation framework 100 may be controlled via an interface configured to provide such switch functionality, between real-time operational mode with a PLC executing control functionalities $f_{1n}$, $f_{2m}$, . . . , $f_{xo}$ in a defined sequence, and the aforementioned service mode. It is thus not necessary to modify the pre-defined sequence in the PLC, which is a complex procedure for all interrelated devices $D_x$.

Generating sets of combined control functionalities $GF_1$, $GF_2$, . . . , $GF_p$, also provides for facilitated distribution and implementation of new software and/or hardware functionalities, and the re-usability of control functionalities can be improved. Having a first processing module 101 configured to isolate coupled control functionalities $f_{xo}$ to provide isolated control functionalities $F_{xo}$ and a second processing module 104 configured to generate sets of combined control functionalities $GF_1$, $GF_2$, . . . , $GF_p$, for the plurality of devices $D_x$ based on the isolated control functionalities $F_{xo}$, provides for an improved module-based framework of device functionalities being particularly advantageous for filling machines and related systems for manufacturing containers provided with fillable food content. Various interrelated devices in such systems may thus be provided with targeted functionalities such as service modules readily implementable, without invoking remaining parts of the system or requiring extensive validation of the new functionalities due to having established sets of combined control functionalities $GF_p$.

Figure 6A:
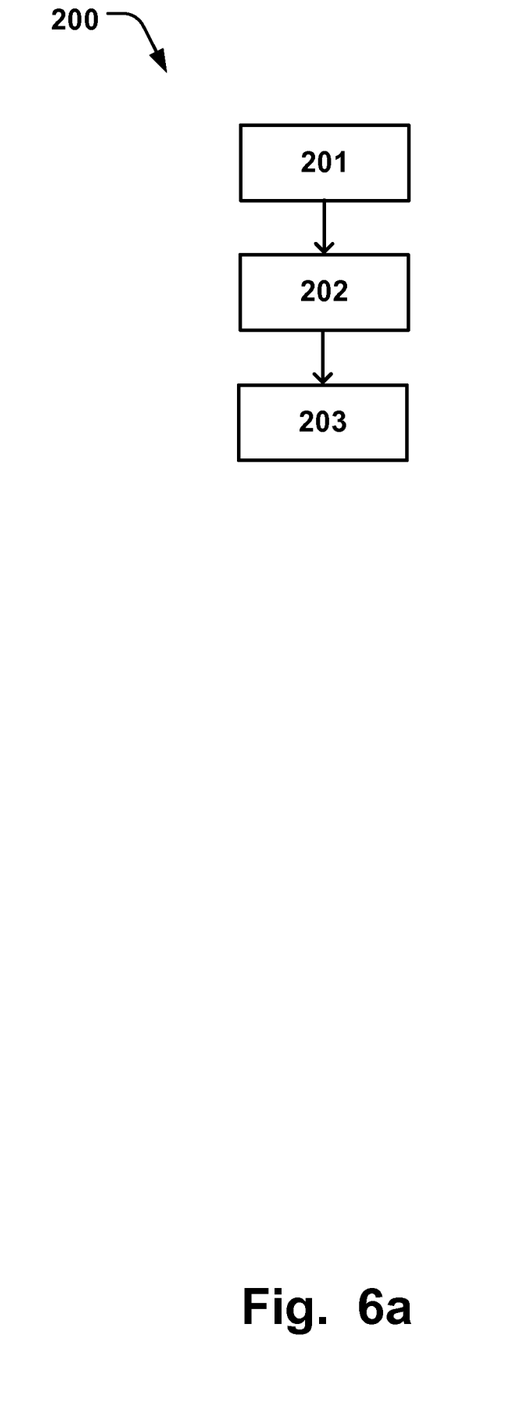
FIG. 6a is a flowchart of a method of controlling an automation framework for a plurality of devices.

FIG. 6a is a schematic illustration of a flow-chart of a method 200 of controlling an automation framework 100 for a plurality of devices $D_1$, $D_2$, connected to associated control modules $CM_1$, $CM_2$, having sets of control functionalities $f_{1n}$, $f_{2m}$, controlling the function of the plurality of devices in response to equipment functions $E_F$ communicating with the control modules $CM_1$, $CM_2$, to activate a series $SQ_1$, $SQ_2$, of said control functionalities. Thus, as mentioned in relation to FIGS. 1-2, for a first device $D_1$ of the plurality of devices, in an associated first control module $CM_1$, a first control functionality $f_{11}$ is in dependence of a second control functionality $f_{12}$ in a first series $SQ_1$ of control functionalities, whereby a change of status of the first control functionality $f_{11}$ to control the first device $D_1$ is associated with a change of status of the second control functionality $f_{12}$. The method 200 comprises isolating 201 the first and second control functionalities $f_{1n}$, $f_{2m}$, from each other so that the first and second control functionalities $f_{1n}$, $f_{2m}$, are independently accessible to a control unit 102 as respective first $F_{11}$ and second $F_{12}$ isolated control functionalities. The status of the first isolated control functionality $F_{11}$ is independent of the status of the second isolated control functionality $F_{12}$.

The first device $D_1$ and a second device $D_2$ of the plurality of devices has thus each respective first $F_{1n}$ and second $F_{2m}$ sets of isolated control functionalities. The method 200 comprises generating 202 a set of combined control functionalities $GF_1, GF_2, \ldots, GF_p$, for the first and/or the second device $D_1, D_2$, based on the first and second sets of isolated control functionalities $F_{1n}, F_{2m}$. The set of combined control functionalities are individually accessible to the control unit 102, and the method 200 comprises controlling 203 at least the first and/or second device $D_1, D_2$, of the plurality of devices based on at least the set of combined control functionalities $GF_1, GF_2, \ldots, GF_p$, with an application manager 105 configured to communicate with the control unit 102. The method 200 thus provides for the advantageous effects as described above in relation to the automation framework 100 and FIGS. 1, 2 and 5.

Figure 5:
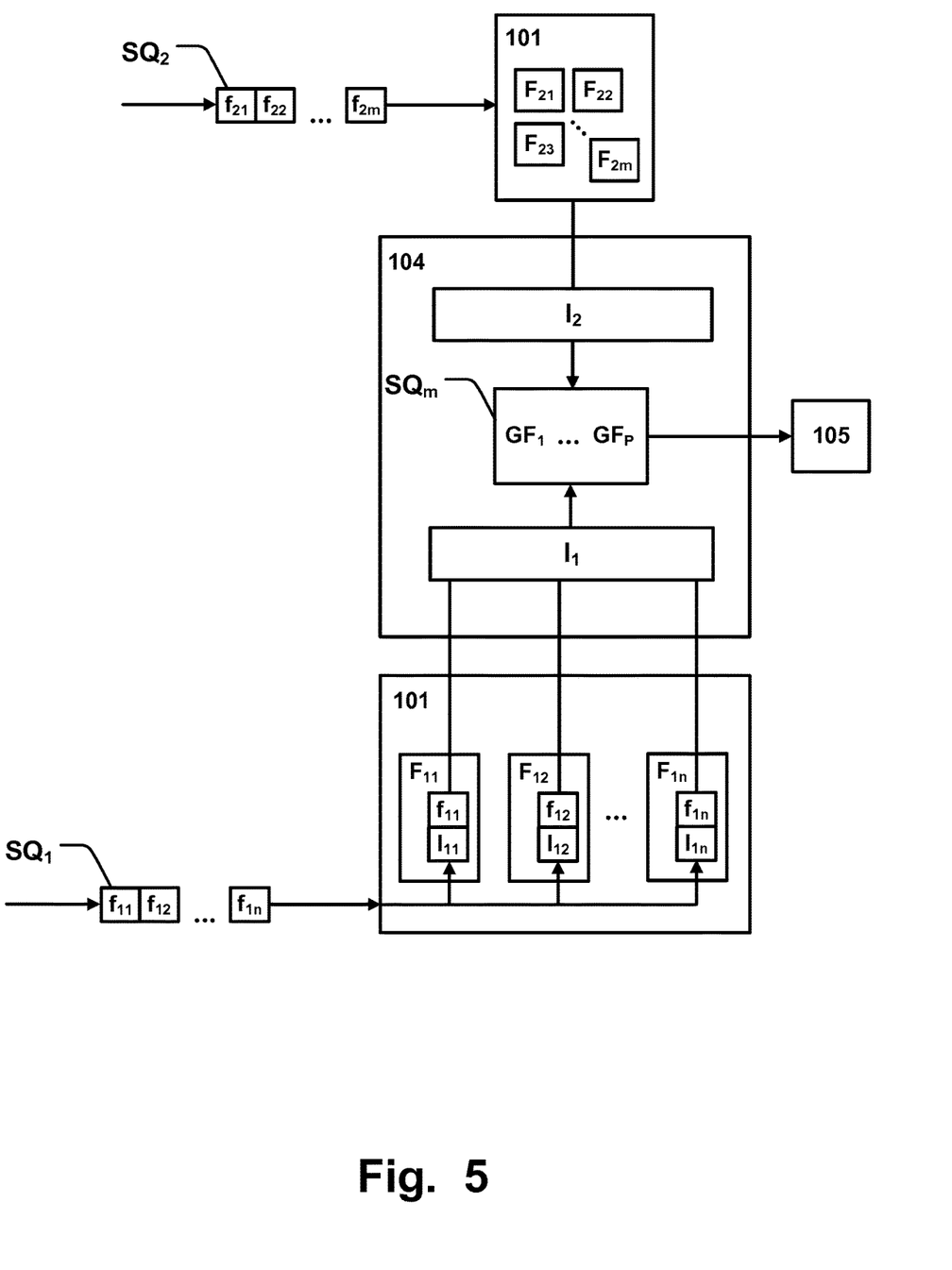
FIG. 5 is a schematic illustration of an automation network according to one example.

The first processing module 101 may be configured to isolate the first and second control functionalities $f_{11}, f_{12}$, from each other by being configured to associate 201' first and second control interfaces $I_{11}, I_{12}$, with the respective first and second control functionalities $f_{11}, f_{12}$, as schematically illustrated in FIG. 5, and to access 201" the first and second control interfaces $I_{11}, I_{12}$, independently from each other. Thus, the first and second control functionalities become independently accessible as the respective first $F_{11}$ and second $F_{12}$ isolated control functionalities. Compared to e.g. FIG. 2, the illustration in FIG. 5 is a further detailed schematic of the flow that the associated control functionalities of the plurality of devices $D_x$ are subjected to in the automation framework 100 to provide the aforementioned targeted functionality. FIG. 5 shows that this principle applies to a general number of control functionalities fin for the series $SQ_1$ associated with the first device $D_1$ previously described in relation to e.g. FIG. 1. I.e. a respective control interface $I_{1n}$ is created for providing the isolated control functionalities Fin. The same applies to the second device $D_2$, although simplified in the illustration of FIG. 5, and to a general number of devices $D_x$ and associated series $SQ_x$ of control functionalities.

Figure 6B:
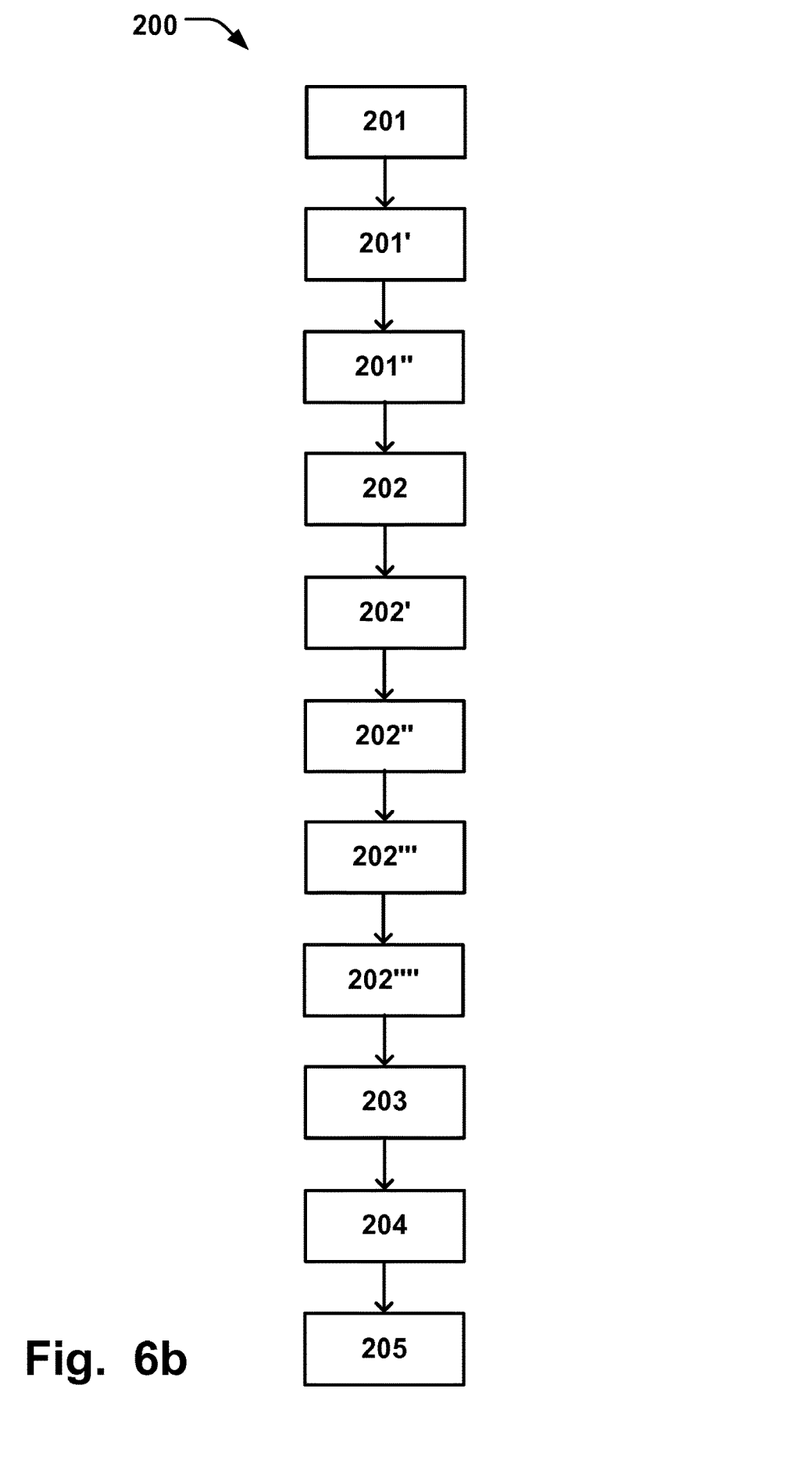
FIG. 6b is a flowchart of a method of controlling an automation framework for a plurality of devices.

FIG. 6b is a schematic illustration of a further flow-chart of a method 200 of controlling an automation framework 100. Thus, the method 200 of isolating the first and second control functionalities $f_{11}, f_{12}$, from each other may comprise associating 201' first and second control interfaces $I_{11}, I_{12}$, with the respective first and second control functionalities $f_{11}, f_{12}$. The method 200 may further comprise accessing 201" the first and second control interfaces $I_{11}, I_{12}$, independently from each other, whereby the first and second control functionalities are independently accessible as the respective first $F_{11}$ and second $F_{12}$ isolated control functionalities.

The second processing module 104 may be configured to generate the set of combined control functionalities $GF_1, GF_2, \ldots, GF_p$, by being configured to associate 202' a third control interface $I_1, I_2$, with the first Fin and second $F_{2m}$ sets of isolated control functionalities, and connect 202', over the third control interface $I_1, I_2$, at least a first modified series $SQ_m$ of the first Fin set and/or second $F_{2m}$ set of isolated control functionalities as at least a first combined control functionality $GF_1, GF_P$. The modified series $SQ_m$ is thus different from $SQ_1$ and $SQ_2$, shown in the example of FIG. 5. I.e. a combination of first $F_{1n}$ and/or second $F_{2m}$ sets of isolated control functionalities (referred to as the modified series $SQ_m$) may now communicate over the third control interface $I_1, I_2$. Several combined control functionalities, $GF_1, \ldots, GF_P$, each defining a modified series $SQ_m$, may thus be defined by connecting combinations of first $F_{1n}$ and/or second $F_{2m}$ sets of isolated control functionalities over the communication path established by the third control interface $I_1, I_2$.

The third control interface $I_1, I_2$, may communicate with the first and second sets of isolated control functionalities $F_{1n}, F_{2m}$, via the control interfaces established in the first processing module 101 (e.g. the aforementioned first and second control interfaces shown as $I_{11}, I_{12}$ in the example of FIG. 5 referring to first and second isolated control functionalities $F_{11}, F_{12}$). FIG. 5 shows a schematic illustration of having the third control interface $I_1, I_2$, to communicate with two different sets of isolated control functionalities $F1_n$, $F1_m$, (shown as two sub interfaces $I_1$ and $I_2$ respectively), although it should be understood that the same principle applies to a general number of sets of isolated control functionalities.

Generating the set of combined control functionalities in the method 200 may accordingly comprise associating 202' a third control interface $I_1, I_2$, with the first $F_{1n}$ and second $F_{2m}$ sets of isolated control functionalities, and connecting 202", over the third control interface $I_1, I_2$, at least a first modified series $SQ_m$ of the first $F_{1n}$ set and/or second $F_{2m}$ set of isolated control functionalities as at least a first combined control functionality $GF_1, GF_P$.

Figure 3:
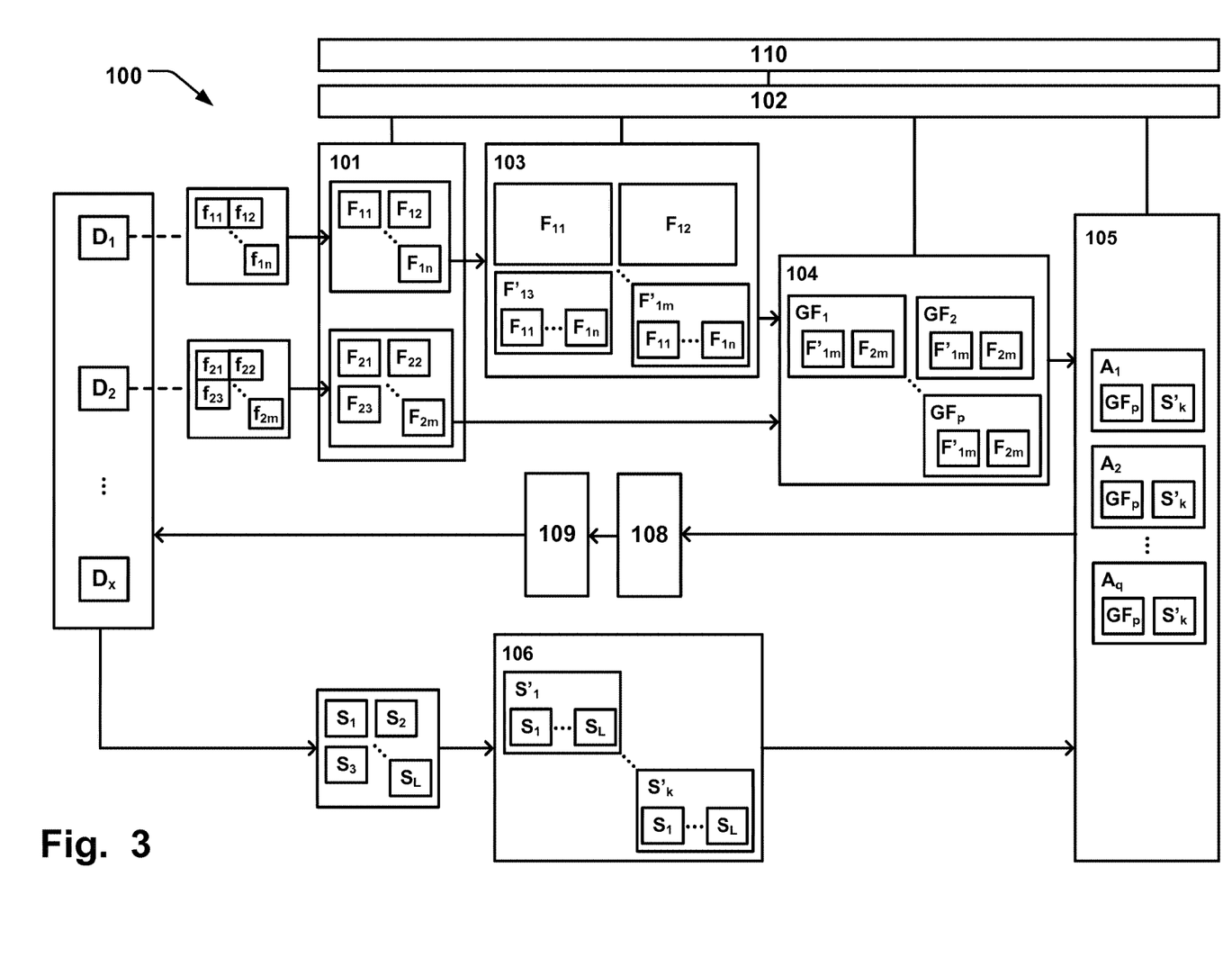
FIG. 3 is a schematic illustration of an automation network according to one example.

The automation framework 100 may comprise a third processing module 103 configured to generate a first subset of isolated control functionalities $F'_{1m}$ of the first device $D_1$ based on the first set of isolated control functionalities $F_{1n}$ so that the first subset $F'_{1m}$ of control functionalities corresponds to the second set of isolated control functionalities $F_{2m}$ of the second device $D_2$. Thus, in case the first and second devices $D_1, D_2$, have initially different functionalities, e.g. due to having been provided by different vendors, the third processing module 103 provides for building any missing functionality from the set of isolated and individually accessible control functionalities Fin. In the example of FIG. 3, the second device $D_2$ has a different set of isolated control functionalities $F_{2m}$, e.g. by having control functionality $F_{23}$, not provided for the first device $D_1$. The third processing module 103 is thus configured to generate a corresponding isolated control functionality $F'_{13}$ based on the individual control functionalities Fin previously isolated from the coupled control functionalities $f_{1n}$. A first subset of control functionalities $F'_{1m}$ may thus be built for the first device $D_1$ that compensates for the previous lack of functionality. The second processing module 104 may then be configured to generate the set of combined control functionalities $GF_1, GF_2, \ldots, GF_p$ for the first and/or the second device $D_1, D_2$, is based on the first subset $F'_{1m}$ and on the second set $F_{2m}$ of isolated control functionalities. New functionality can thus be implemented efficiently, due to first providing for the individually accessible isolated control functionalities $F_{1n}, F_{2m}$, and by subsequent compensation by combination of the individually accessible control functionalities $F_{1n}, F_{2m}$, to provide for sets of combined control functionalities $GF_1, GF_2, \ldots, GF_p$. Sets of combined functions can thus be efficiently provided even in automation systems having devices provided with a range of configurations and initial functionalities. This thus provides for an improved and facilitated integration of new devices and functionalities in existing automation systems. As described above, the application manager 105 may then be configured to combine any plurality of the combined control functionalities $GF_p$, including any subsets of control functionalities $F'_{1m}$, as individual sets of application modules $A_1$, $A_2, \ldots, A_q$, for controlling any of the devices $D_x$. The example of FIG. 3 illustrates a particular generated subset of control functionalities $F'_{1m}$, but the third processing module 103 is configured to generate any subset of isolated control functionalities for any of the plurality of devices $D_x$ based on any of the isolated control functionalities $F_{1n}$, $F_{2m}$.

The method 200 may thus comprise generating 202''' a first subset of isolated control functionalities $F'_{1m}$ of the first device $D_1$ based on the first set Fin of isolated control functionalities so that the first subset $F'_{1m}$ of control functionalities corresponds to the second set $F_{2m}$ of isolated control functionalities of the second device $D_2$. The method may further comprise generating the set of combined control functionalities $GF_1, GF_2, \ldots, GF_p$, for the first and/or the second device $D_1, D_2$, based on the first subset $F'_{1m}$ and on the second set $F_{2m}$ of isolated control functionalities.

Each of the plurality of devices $D_x$ may have a set of output data $S_1, S_2, S_3, \ldots, S_L$ accessible to the control unit 102. The application manager 105 may be configured to control the function of at least the first and/or second device $D_1$, $D_2$, of the plurality of devices $D_x$ based on the set of combined control functionalities $GF_p$ and the set of output data $S_L$. I.e. the application manager 105 may then be configured to combine any plurality of the combined control functionalities $GF_p$, including the output data $S_L$, as individual sets of application modules $A_1, A_2, \ldots, A_q$, for controlling any of the devices $D_x$.

The automation framework 100 may comprise a first output data processing module 106 configured to generate a subset of output data $S'_k$ accessible to the control unit 102 based on the set of output data $S_L$, as schematically illustrated in FIG. 3. It is thus provided for generating customized output signals where the application manager 105 is configured to control the function of at least the first and/or second device $D_1, D_2$, of the plurality of devices $D_x$ based on the set of output data $S_L$ and the subset of output data $S'_k$. This further provides for achieving a highly customizable and targeted application building for any of the plurality of devices $D_x$.

Turning again to the method 200, each of the plurality of devices $D_x$ may thus have a set of output data $S_L$ accessible to the control unit 102. The method 200 may comprise generating 204 a subset of output data $S'_k$ accessible to the control unit 102 based on the set of output data $S_L$. The method 200 may further comprise controlling 205 the function of at least the first and/or second device $D_1, D_2$, of the plurality of devices $D_x$ based on the set of output data $S_L$ and the subset of output data $S'_k$.

Figure 4:
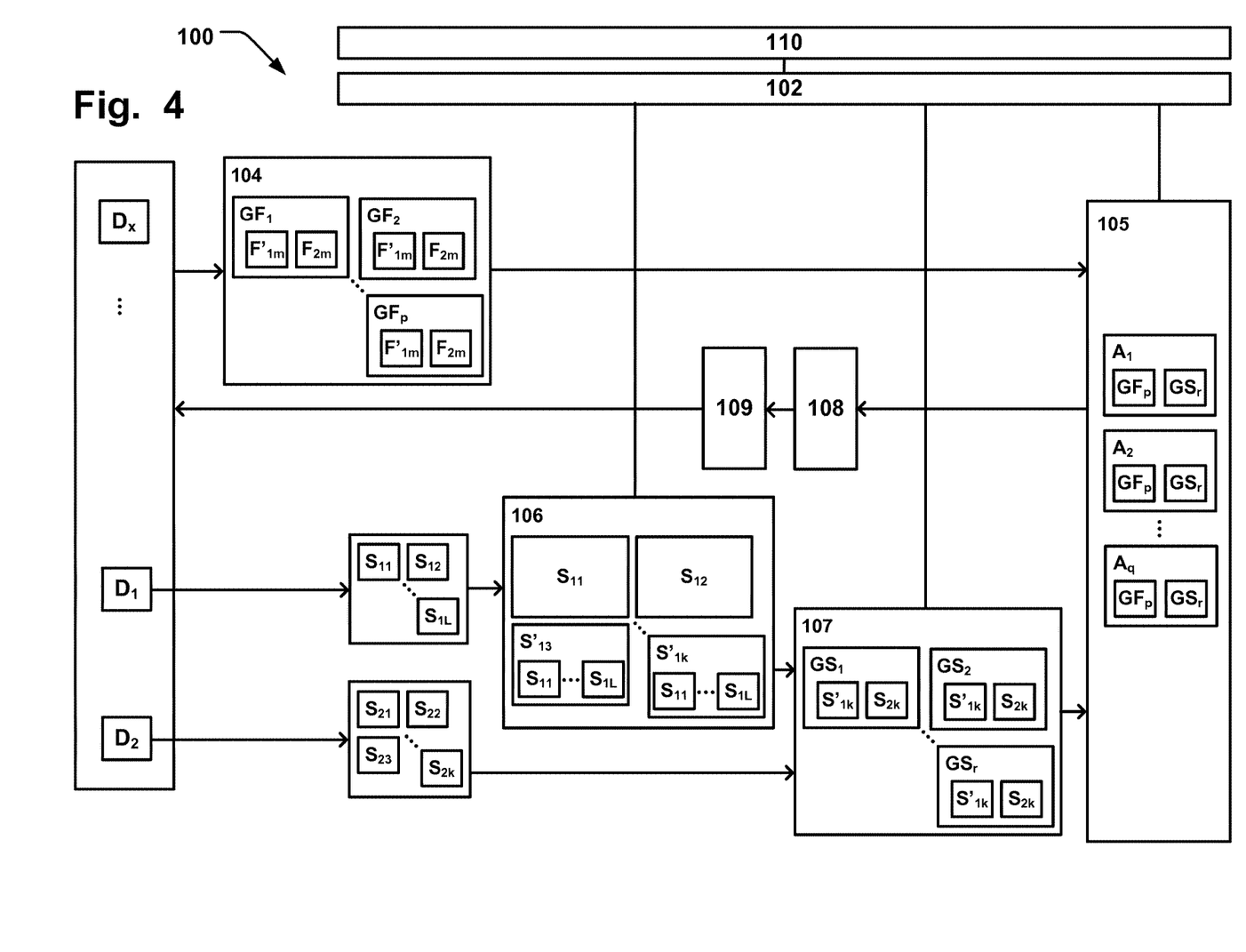
FIG. 4 is a schematic illustration of an automation network according to one example.

Furthermore, the first and second device $D_1, D_2$, may have respective first and second sets of output data $S_{1L}, S_{2k}$, as schematically illustrated in FIG. 4. The first output data processing module 106 may be configured to generate a first subset of output data $S'_{1k}$ accessible to the control unit 102 based on the first set of output data $S_{1L}$ so that the first subset of output data $S'_{1k}$ corresponds to the second set of output data $S_{2k}$. Thus, as with the different sets of control functionalities $f_{1n}, f_{2m}$, described in relation to FIG. 2, the sets of output data may differ between the plurality of devices $D_1$, $D_2$, $D_x$. The first output data processing module 106 may thus compensate for missing output data functionality of the first device $D_1$ by generating a subset of output data $S'_{1k}$, e.g. a new output data parameter $S'_{13}$ based on the first set of output data $S_{1L}$, corresponding to output $S_{23}$ of device $D_2$, in the example of FIG. 4. The automation framework 100 may comprise a second output data processing module 107 configured to generate a combined set of output data $GS_1$, $GS_2, \ldots, GS_r$, for the first and/or second device $D_1, D_2$, based on the first subset $S'_{1k}$ of output data and on the second set $S_{2k}$ of output data. The application manager 105 may then be configured to combine any plurality of the combined control functionalities $GF_p$, including the combined set of output data $GS_1, GS_2, \ldots, GS_r$, as individual sets of application modules $A_1, A_2, \ldots, A_q$, for controlling any of the devices $D_x$.

The automation framework 100 may comprise a simulation module 108 comprising a virtual- and/or software representation of the plurality of devices $D_x$. The application manager 105 may be configured to communicate with the simulation module 108 to simulate the function of at least the first and/or second device $D_1, D_2$, of the plurality of devices $D_x$ based on the set of combined control functionalities $GF_p$. Associated control modules $CM_x$ (not shown in FIGS. 2-4 for clarity of presentation), to each of the plurality of devices $D_x$, may thus be communicating with the simulation module 108 for controlling whether or not associated devices $D_x$ should be activated or if the function thereof should be simulated. The associated advantages from the building of targeted device functionalities as described above are further emphasized due to the facilitated simulation abilities provided for in the automation framework 100. Application modules $A_1, A_2, \ldots, A_q$, based on combinations of combined control functionalities $GF_p$ and/or combined sets of output data $GS_1, GS_2, \ldots, GS_r$, are readily representable in the simulation module 108 in an improved manner due to the module-based framework of the device functionalities in the automation framework 100 and associated method 200, as elucidated above.

The automation framework 100 may comprise a device mapping module 109 configured to map the set of combined control functionalities $GF_p$ from the simulation module 108 to the plurality of devices $D_x$ for controlling the function thereof. The device mapping module 109 is thus also in communication with the respective control modules $CM_x$, and proved for a facilitated control of the simulation environment and subsequent implementation of the simulation in the production line.

As mentioned, the application manager 105 may be configured to combine a plurality of the combined control functionalities $GF_p$ and/or the set of output data $GS_r$, as individual sets of application modules $A_1, A_2, \ldots, A_q$. Application modules can be distributed centrally and installed in individual setups. The automation framework 100 may comprise a control interface 110 in communication with the control unit 102. The control interface 110 may comprise a visual representation of the individual sets of application modules $A_1, A_2, \ldots, A_q$. This provides for facilitated control of the application modules to a user.

A computer program product is provided comprising instructions which, when the program is executed by a computer, cause the computer to carry out the steps of the method 200 as described above.

A filling machine is provided comprising an automation framework 100 as described above in relation to FIGS. 1-4, and/or controlled by the method 200 as described above.

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. A method of controlling an automation framework for a plurality of devices ($D_1, D_2, \ldots, D_x$) in a manufacturing system for containers with food content, each of the devices being connected to respective associated control modules ($CM_1, CM_2, \ldots, CM_x$) having sets of control functionalities ($f_{1n}, f_{2m}, \ldots, f_{xo}$) controlling the function of the plurality of devices in response to equipment functions ($E_F$) communicating with the control modules to activate a series ($SQ_1, SQ_2, \ldots, SQ_x$) of said control functionalities, wherein, for a first device ($D_1$) of the plurality of devices, in an associated first control module ($CM_1$), a first control functionality ($f_{11}$) is in dependence of a second control functionality ($f_{12}$) in a first series ($SQ_1$) of control functionalities, whereby a change of status of the first control functionality to control the first device is associated with a change of status of the second control functionality, wherein the method comprises:

isolating the first and second control functionalities from each other so that the first and second control functionalities are independently accessible to a control unit as respective first ($F_{11}$) and second ($F_{12}$) isolated control functionalities, whereby the status of the first isolated control functionality is independent of the status of the second isolated control functionality, whereby the first device and a second device ($D_2$) of the plurality of devices each has respective first ($F_{1n}$) and second ($F_{2m}$) sets of isolated control functionalities, generating a set of combined control functionalities ($GF_1, GF_2, \ldots, GF_p$) for the first and/or the second device based on the first and second sets of isolated control functionalities, wherein the set of combined control functionalities are individually accessible to the control unit, and controlling at least the first and/or second device of the plurality of devices based on at least the set of combined control functionalities with an application manager configured to communicate with the control unit.

2. The method according to claim 1, wherein the isolating the first and second control functionalities from each other comprises:

associating first and second control interfaces ($I_{11}, I_{12}$) with the respective first and second control functionalities, and accessing the first and second control interfaces, independently from each other, whereby the first and second control functionalities are independently accessible as the respective first ($F_{11}$) and second ($F_{12}$) isolated control functionalities.

3. The method according to claim 1, wherein the generating the set of combined control functionalities comprises:

associating a third control interface ($I_1, I_2$) with the first ($F_{1n}$) and second ($F_{2m}$) sets of isolated control functionalities, and connecting, over the third control interface, at least a first modified series ($SQ_m$) of the first ($F_{1n}$) set and/or second ($F_{2m}$) set of isolated control functionalities as at least a first combined control functionality ($GF_1, GF_P$).

4. The method according to claim 1, further comprising:

generating a first subset of isolated control functionalities ($F'_{1m}$) of the first device based on the first set of isolated control functionalities so that the first subset of control functionalities corresponds to the second set of isolated control functionalities of the second device, wherein the generating the set of combined control functionalities ($GF_1, GF_2, \ldots, GF_p$) for the first and/or the second device is based on the first subset and on the second set of isolated control functionalities.

5. The method according to claim 1, wherein each of the plurality of devices has a set of output data ($S_L$) accessible to the control unit, wherein the method further comprises:

generating a subset of output data ($S'_k$) accessible to the control unit based on the set of output data, and controlling the function of at least the first and/or second device of the plurality of devices based on the set of output data and the subset of output data.

6. A computer program product comprising instructions which, when executed by a computer, cause the computer to carryout the method according to claim 1.

7. A filling machine controlled by the method according to claim 1.

8. An automation framework for a plurality of devices ($D_1, D_2$) in a manufacturing system for containers with food content, each of the devices being connected to respective associated control modules ($CM_1, CM_2, \ldots, CM_x$) having sets of control functionalities ($f_{1n}, f_{2m}, \ldots, f_{xo}$) controlling the function of the plurality of devices in response to equipment functions ($E_F$) communicating with the control modules to activate a series ($SQ_1, SQ_2, \ldots, SQ_x$) of said control functionalities, wherein, for a first device ($D_1$) of the plurality of devices, in an associated first control module ($CM_1$), a first control functionality ($f_{11}$) is in dependence of a second control functionality ($f_{12}$) in a first series ($SQ_1$) of control functionalities, whereby a change of status of the first control functionality to control the first device is associated with a change of status of the second control functionality, wherein the automation framework comprises:

a first processing module comprising first executable instructions configured to cause a computer to isolate the first and second control functionalities from each other so that the first and second control functionalities are independently accessible to a control unit as respective first ($F_{11}$) and second ($F_{12}$) isolated control functionalities, whereby the status of the first isolated control functionality is independent of the status of the second isolated control functionality, whereby the first device and a second device ($D_2$) of the plurality of devices each has respective first ($F_{1n}$) and second ($F_{2m}$) sets of isolated control functionalities, a second processing module comprising second executable instructions configured to cause the computer to generate a set of combined control functionalities ($GF_1, GF_2, \ldots, GF_p$) for the first and/or second device based on the first and second sets of isolated control functionalities, wherein the set of combined control functionalities are individually accessible to the control unit, and an application manager comprising third executable instructions configured to cause the computer to communicate with the control unit to control at least the first and/or second device of the plurality of devices based on at least the set of combined control functionalities, and wherein the first, second, and third executable instructions are stored on a computer readable medium.

9. The automation framework according to claim 8, wherein the first processing module is configured to:
associate first and second control interfaces ($I_{11}$, $I_{12}$) with the respective first and second control functionalities, and
access the first and second control interfaces, independently from each other, whereby the first and second control functionalities are independently accessible as the respective first ($F_{11}$) and second ($F_{12}$) isolated control functionalities.

10. The automation framework according to claim 8, wherein the second processing module is configured to:
associate a third control interface ($I_1$, $I_2$) with the first ($F_{1n}$) and second ($F_{2m}$) sets of isolated control functionalities, and
connect, over the third control interface, at least a first modified series ($SQ_m$) of the first ($F_{1n}$) set and/or second ($F_{2m}$) set of isolated control functionalities as at least a first combined control functionality ($GF_1$, $GF_P$).

11. The automation framework according to claim 8, further comprising:
a third processing module comprising fourth executable instructions configured to cause the computer to generate a first subset of isolated control functionalities ($F'_{1m}$) of the first device based on the first set of isolated control functionalities so that the first subset of control functionalities corresponds to the second set of isolated control functionalities of the second device,
wherein the second processing module is configured to generate the set of combined control functionalities ($GF_1$, $GF_2$, . . . , $GF_p$) for the first and/or the second device is based on the first subset and on the second set of isolated control functionalities.

12. The automation framework according to claim 8, wherein each of the plurality of devices has a set of output data ($S_L$) accessible to the control unit, and
wherein the application manager is configured to control the function of at least the first and/or second device of the plurality of devices based on the set of combined control functionalities and the set of output data.

13. The automation framework according to claim 12, further comprising:
a first output data processing module comprising fourth executable instructions configured to cause the computer to generate a subset of output data ($S'_k$) accessible to the control unit based on the set of output data,
wherein the application manager is configured to control the function of at least the first and/or second device of the plurality of devices based on the set of output data and the subset of output data.

14. The automation framework according to claim 13, wherein the first and second device has respective first and second sets of output data ($S_{1L}$, $S_{2k}$),
wherein the first output data processing module is configured to generate a first subset of output data ($S'_{1k}$) accessible to the control unit based on the first set of output data so that the first subset of output data corresponds to the second set of output data, and
wherein the automation framework further comprises:
a second output data processing module comprising fifth executable instructions configured to cause the computer to generate a combined set of output data ($GS_1$, $GS_2$, . . . , $GS_r$) for the first and/or second device based on the first subset of output data and the second set of output data.

15. The automation framework according to claim 12, wherein the application manager is configured to combine a plurality of the combined control functionalities and/or the set of output data as individual sets of application modules ($A_1$, $A_2$, . . . , $A_q$).

16. The automation framework according to claim 15, further comprising a control interface in communication with the control unit, wherein the control interface comprises a visual representation of the individual sets of application modules.

17. The automation framework according to claim 8, further comprising:
a simulation module comprising fourth executable instructions comprising a virtual representation of the plurality of devices, wherein the application manager is configured to communicate with the simulation module to cause the computer to simulate the function of at least the first and/or second device of the plurality of devices based on the set of combined control functionalities.

18. The automation framework according to claim 17, further comprising a device mapping module configured to map the set of combined control functionalities from the simulation module to the plurality of devices for controlling the function thereof.

* * * * *

UNITED STATES PATENT AND TRADEMARK OFFICE
CERTIFICATE OF CORRECTION

PATENT NO. : 10,866,571 B2
APPLICATION NO. : 16/612551
DATED : December 15, 2020
INVENTOR(S) : Magnus Carlsson and Davide Clo'

Page 1 of 1

It is certified that error appears in the above-identified patent and that said Letters Patent is hereby corrected as shown below:

In the Specification

In Column 7, at Line 34, delete "fin" and insert --$f_{1n}$--.

In Column 7, at Line 38, delete "Fin." and insert --$F_{1n}$.--.

In Column 7, at Line 57, delete "Fin" and insert --$F_{1n}$--.

In Column 7, at Line 60, delete "Fin" and insert --$F_{1n}$--.

In Column 8, at Line 38, delete "Fin." and insert --$F_{1n}$.--.

In Column 8, at Line 44, delete "Fin" and insert --$F_{1n}$--.

In the Claims

In Column 11, at Line 14, Claim 1, delete "($S_{Q1}$," and insert --($SQ_1$,--.

In Column 12, at Line 22, Claim 6, delete "carryout" and insert --carry out--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*